United States Patent
Kade

(10) Patent No.: US 7,966,118 B2
(45) Date of Patent: Jun. 21, 2011

(54) AUTOMATIC TIME HEADWAY SETTING FOR ADAPTIVE CRUISE CONTROL SYSTEM

(75) Inventor: Alexander Kade, Grosse Pointe Woods, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 757 days.

(21) Appl. No.: 11/958,623

(22) Filed: Dec. 18, 2007

(65) Prior Publication Data
US 2009/0157276 A1 Jun. 18, 2009

(51) Int. Cl.
*B60W 30/16* (2006.01)
*B60T 7/14* (2006.01)

(52) U.S. Cl. .......... 701/96; 701/93; 701/301; 700/304; 342/70; 180/167

(58) Field of Classification Search .................... None
See application file for complete search history.

(56) References Cited

U.S. PATENT DOCUMENTS

| | | | | |
|---|---|---|---|---|
| 6,081,763 A | * | 6/2000 | Smith et al. | 701/93 |
| 6,233,515 B1 | * | 5/2001 | Engelman et al. | 701/96 |
| 6,275,764 B1 | * | 8/2001 | Sielagoski et al. | 701/93 |
| 2003/0085066 A1 | * | 5/2003 | Labuhn et al. | 180/167 |
| 2004/0254712 A1 | * | 12/2004 | Leineweber et al. | 701/96 |
| 2007/0142996 A1 | * | 6/2007 | Lee | 701/96 |

OTHER PUBLICATIONS

Winner, Witte, Uhler, and Lichtenberg, "Adaptice Cruise Control Sysytem Aspects and Development Trends", from Overview and Update of ITS Developments (SP-1143), SAE 961010, Feb. 1996.*

* cited by examiner

*Primary Examiner* — Thomas G Black
*Assistant Examiner* — Lin B Olsen
(74) *Attorney, Agent, or Firm* — Quinn Law Group, PLLC

(57) ABSTRACT

An adaptive cruise control system automatically sets a desired headway value upon system initiation. If a preceding vehicle is not detected the desired headway is established at a predetermined value. If a preceding vehicle is detected the control compares the actual headway to a predetermined minimum value and predetermined maximum value to select a desired headway. Following the desired headway value being established, the value is stored in the control and the adaptive cruise control system begins customary operations.

14 Claims, 3 Drawing Sheets

US 7,966,118 B2

AUTOMATIC TIME HEADWAY SETTING FOR ADAPTIVE CRUISE CONTROL SYSTEM

TECHNICAL FIELD

The present invention relates generally to cruise control systems for automobiles, and more specifically to automatically establishing a headway setting for an adaptive cruise control system when a vehicle operator initiates the adaptive cruise control system.

BACKGROUND OF THE INVENTION

Conventional cruise control systems regulate vehicle speed according to a speed setting that a vehicle operator may set and adjust while driving. Adaptive cruise control systems detect moving objects in the vehicle path, such as preceding vehicles, and provide throttle and brake control, as necessary, to maintain a trailing distance from the preceding vehicle.

A headway, or time gap, between the two vehicles is calculated based upon the vehicle speed and the trailing distance from the preceding vehicle. The calculated information is used to maintain a desired headway between the vehicles based on a preset headway value for the adaptive cruise control system. Thus, the adaptive cruise control system can maintain a varying distance from the preceding vehicle as appropriate for the vehicle speed.

Adaptive cruise control systems can cause the vehicle to throttle or brake when the speed is set until the actual headway with the preceding vehicle corresponds to the present headway value for the adaptive cruise control system. In some cases, the headway setting can be incrementally adjusted by the vehicle operator following setting the speed for the adaptive cruise control system.

SUMMARY OF THE INVENTION

An adaptive cruise control system which automatically establishes a headway setting at initiation of the adaptive cruise control system is desired.

A vehicle includes an adaptive cruise control system that a vehicle operator initiates by selecting a desired vehicle speed. A control manages the adaptive cruise control system and receives the desired vehicle speed set by the vehicle operator. The control is connected to a sensor for detecting the distance between the vehicle and a preceding vehicle. The control calculates an actual headway, or time gap, between the two vehicles and utilizes the information to maintain a desired headway between the source vehicle and the preceding vehicle. Upon initiation of the adaptive cruise control system the control automatically sets the desired headway value.

If a preceding vehicle is not detected the desired headway is established at a predetermined value. If a preceding vehicle is detected the control compares the actual headway to a predetermined minimum value and a predetermined maximum value to select a desired headway. If the actual headway is less than the predetermined minimum value the desired headway is established at the predetermined minimum value. If the actual headway is greater than the predetermined maximum value the desired headway is established at the predetermined maximum value. If the actual headway to the preceding vehicle is between the predetermined minimum value and the predetermined maximum value then the desired headway is established at the value of the actual headway.

Following the desired headway value being established, the value is stored in the control and the adaptive cruise control system begins customary operations. The required throttle or brake/coast of the vehicle until the actual headway is equal to the desired headway is reduced because the desired headway is reset at each implementation of the adaptive cruise control system.

Once the desired headway is established the vehicle operator can adjust the headway using a gap adjust switch to incrementally increase or incrementally decrease the stored headway. In another embodiment, the vehicle operator can adjust the desired headway by resetting the desired speed with the set/coast switch.

The above features and advantages, and other features and advantages of the present invention will be readily apparent from the following detailed description of the preferred embodiments and best modes for carrying out the present invention when taken in connection with the accompanying drawings.

DESCRIPTION OF THE PREFERRED EMBODIMENTS

Figure 1:
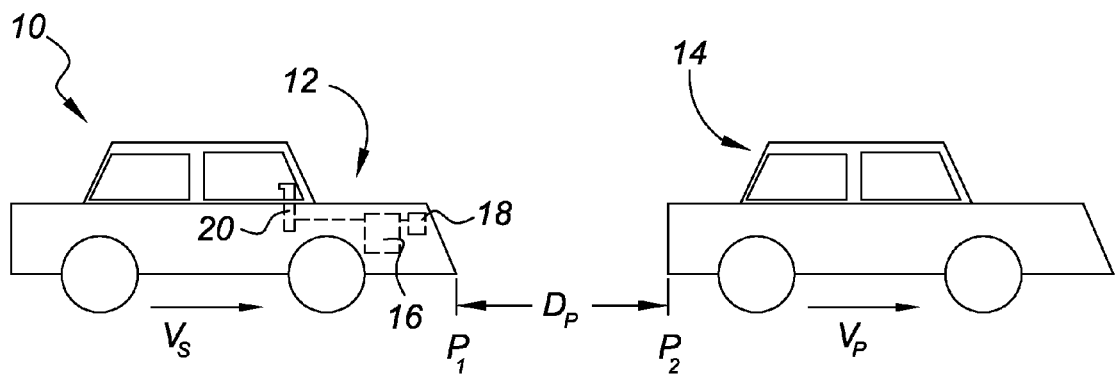
FIG. 1 is a schematic view illustrating a vehicle having the adaptive cruise control system of the present invention and a preceding vehicle.

Referring to the Figures, wherein like reference numbers refer to the same or similar components throughout the several views, FIG. 1 is a schematic view of an exemplary motor vehicle, identified generally as 10, having an adaptive cruise control system 12 of the present invention. A preceding vehicle 14 is located on a roadway a distance ahead of the source vehicle 10.

A vehicle operator initiates the adaptive cruise control system 12 by selecting a desired vehicle speed $V_S$. A control 16 manages the adaptive cruise control system 12 and receives the desired vehicle speed $V_S$ set by the vehicle operator. The control 16 is connected to a sensor 18 for detecting the distance between the source vehicle 10 and the preceding vehicle 14. The sensor 18 may be any type of sensor that provides range information. The sensor 18 may also provide additional information to the control 16 to support customary operations of the adaptive cruise control system 12.

The distance between the source vehicle 10 and the preceding vehicle 14 is represented by $D_P$. $D_P$ is the distance between the front of vehicle 10, illustrated as $P_1$, and the rear of the preceding vehicle 14, illustrated as $P_2$. Knowing the speed $V_S$ of the source vehicle 12 and the distance $D_P$ between the source vehicle 10 and the preceding vehicle 14 the control 16 can calculate the headway $T_{HDWAY}$, or the time gap, between the two vehicles. The headway $T_{HDWAY}$ is the time it takes for the source vehicle 10, to travel from $P_1$ to $P_2$. The control 16 periodically recalculates the headway $T_{HDWAY}$ to account for variations in the distance $D_P$ resulting from variations in a speed $V_P$ of the preceding vehicle 14.

The control 16 utilizes the calculated headway $T_{HDWAY}$ information to throttle or brake the source vehicle 12 in order to maintain a desired headway $T_{HDWAY\_DES}$ between the source vehicle 10 and the preceding vehicle 14. Thus, the adaptive cruise control system 12 can maintain a distance $D_P$ between the source vehicle 10 and the preceding vehicle 14, varying as appropriate to the vehicle speed $V_S$. If no preceding vehicle 14 is detected by the sensor 18 the adaptive cruise control system 12 maintains the vehicle speed $V_S$ at the speed set by the vehicle operator.

The control 16 is connected to a steering wheel 20 having user inputs 22 (shown in FIG. 2) for setting and adjusting the adaptive cruise control system 12. Although the adaptive cruise control system 12 is illustrated with user inputs 22 located on a steering wheel 20, other arrangements may be utilized to provide user inputs 22, as is known in the art. For example, the user inputs 22 may be provided on a separate stalk extending from a steering column or located on an instrument panel for the vehicle 10.

Figure 2:
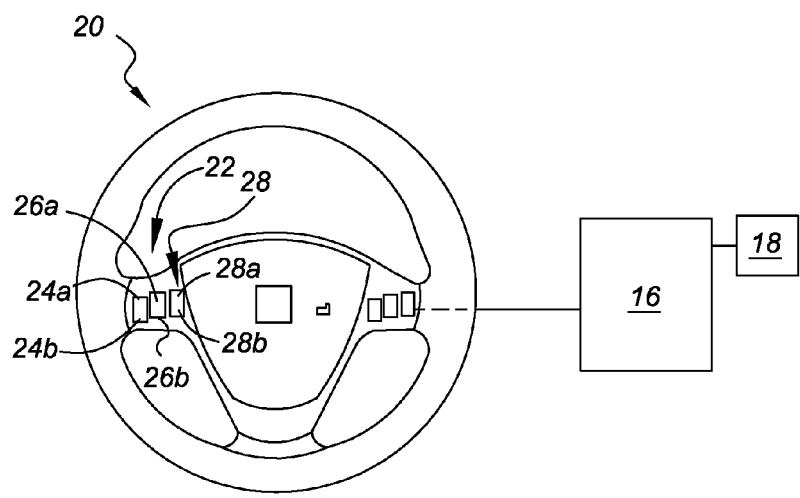
FIG. 2 is a schematic view of a steering wheel having user inputs for the adaptive cruise control system of the present invention.

FIG. 2 illustrates a schematic view of the control 16, the sensor 18 and the steering wheel 20. The sensor 18 is located remotely from and connected with the control 16 to provide data to the control 16. The sensor 18 is located on the source vehicle 10 in a position that allows the sensor 18 to sense the preceding vehicle 14. One skilled in the art would know the appropriate position for placing the sensor 18.

The steering wheel 20 includes a plurality of user inputs 22, shown as toggle switches. The user inputs include, an ON/OFF switch 24a, a set/coast switch 24b, a resume/accelerate switch 26a, a cancel switch 26b and a gap adjust switch 28. The gap adjust switch 28 includes an incremental increase 28a and an incremental decrease 28b. The gap adjust switch 28 allows the vehicle operator to adjust the desired headway $T_{HDWAY\ DES}$. The user inputs 22 may be arranged in other manners as is known in the art.

The adaptive cruise control system 12 is initiated with ON/OFF switch 24a. The user establishes a desired speed $V_S$ using the set/coast switch 24b. The control 16 maintains the desired speed $V_S$ of the source vehicle 10. If a preceding vehicle 14 is detected the control 16 adjusts the speed $V_S$ of the source vehicle 10 through throttle and brake control to maintain a desired headway $T_{HDWAY\ DES}$ between the source vehicle 10 and the preceding vehicle 14. The desired headway $T_{HDWAY\ DES}$ is established upon initiation of the adaptive cruise control system 12, as described with respect to FIG. 3. Following that, the vehicle operator can adjust the desired $T_{HDWAY\ DES}$ with the gap adjust switch 28.

Figure 3:
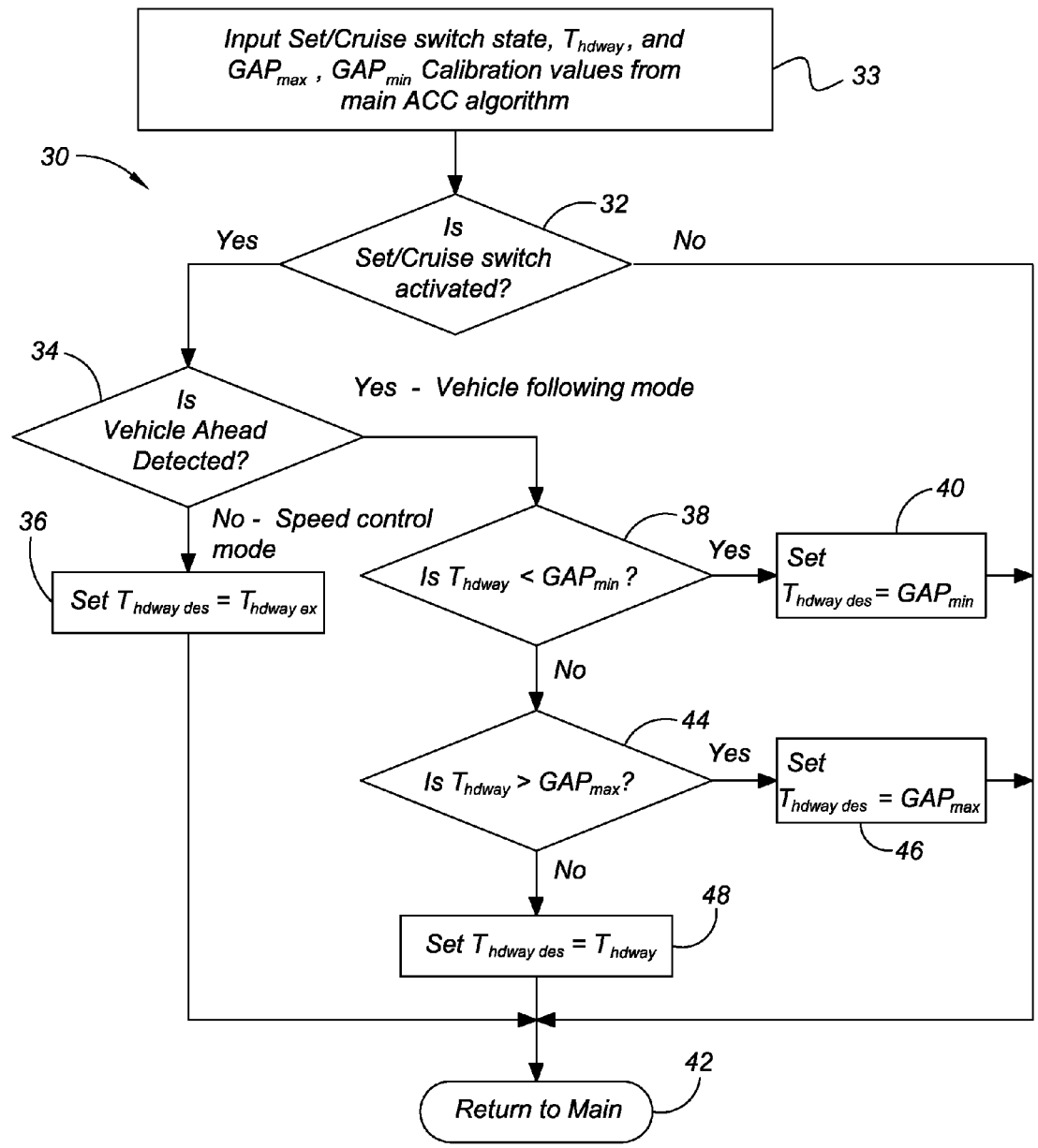
FIG. 3 is a block diagram illustrating automatic setting of the headway for the adaptive cruise control system of the present invention.

FIG. 3 is a block diagram 30 illustrating automatic setting of the desired headway $T_{HDWAY\ DES}$ of the adaptive cruise control system 12 of the present invention. The vehicle operator initiates, step 32, the adaptive cruise control system 12 by setting a vehicle speed $V_S$ using the set/coast switch 24b. The sensor 18 relays the sensed data regarding the detection and the distance $D_P$ of the preceding vehicle 14 to the control 16. If the preceding vehicle 14 is detected the actual headway $T_{HDWAY}$ is also relayed to the control 16. A predetermined minimum headway value and predetermined maximum headway value are stored within the control 16. Stored information within the control 16 is illustrated as box 33.

The control 16 determines, step 34, whether a preceding vehicle 14 is detected. If a preceding vehicle 14 is not detected the desired headway $T_{HDWAY\ DES}$ is established, step 36, at the existing headway value $T_{HDWAY\ EX}$ and the value is stored in the control 16. The existing headway value $T_{HDWAY\ EX}$ is the last desired headway $T_{HDWAY\ DES}$ value stored by the control 16. If no desired headway $T_{HDWAY\ DES}$ value is stored within the control 16 the desired headway $T_{HDWAY\ DES}$ is established at a predetermined value, such as a predetermined maximum headway value. For example, an existing headway $T_{HDWAY\ EX}$ value may not be stored within the control 16 if the adaptive cruise control system 12 has not been implemented since the last ignition of the vehicle 10. The adaptive cruise control system 12 can be configured to reset the existing headway $T_{HDWAY\ EX}$ each time the ignition in cycled. Other predetermined values may be established as the default existing headway $T_{HDWAY\ EX}$ for use when no preceding vehicle 14 is detected. One skilled in the art would know acceptable values to establish as a default existing headway $T_{HDWAY\ EX}$.

If a preceding vehicle 14 is detected the control 16 compares, step 38, the actual headway $T_{HDWAY}$ to a predetermined minimum value. If the vehicle headway $T_{HDWAY}$ is less than the predetermined minimum value the desired headway $T_{HDWAY\ DES}$ is established, step 40, at the predetermined minimum value and the value is stored in the control 16. Following storing the value $T_{HDWAY\ DES}$, customary operations of the adaptive cruise control system 12 begin, step 42. The control 16 will brake/coast the vehicle 10 until the actual $T_{HDWAY}$ is equal to the desired headway $T_{HDWAY\ DES}$.

If the actual headway $T_{HDWAY}$ to the preceding vehicle 14 is greater than the predetermined minimum value the control 16 compares, step 44, the actual headway $T_{HDWAY}$ to a predetermined maximum value. If the actual headway $T_{HDWAY}$ is greater than the predetermined maximum value the desired headway $T_{HDWAY\ DES}$ setting is established, step 46, at the predetermined maximum value and the value is stored in the control 16. Following storing the value $T_{HDWAY\ DES}$, customary operations of the adaptive cruise control 12 begin, step 42. The control 16 will throttle the vehicle 10 until the actual headway $T_{HDWAY}$ is equal to the desired headway $T_{HDWAY\ DES}$.

If the actual headway $T_{HDWAY}$ to the preceding vehicle 14 is greater than the predetermined minimum value, as previously determined, and less than the predetermined maximum value then the desired headway $T_{HDWAY\ DES}$ is established, step 48, at the value of the actual headway $T_{HDWAY}$. Following the desired headway $T_{HDWAY\ DES}$ value being established, the value is stored in the control 16 and customary operations of the adaptive cruise control 12 begin, step 42.

The vehicle operator can adjust the desired headway $T_{HDWAY\ DES}$ value using the gap adjust switch 28 to incrementally increase 28a or incrementally decrease 28b the stored headway $T_{HDWAY\ DES}$. The gap adjust switch 28 typically has incremental settings of 3 or more varying settings between the predetermined minimum and the predetermined maximum value. A typical minimum value is 1 second and a typical maximum value is 2.5 seconds. The gap adjust switch 28 can be established to adjust the headway value by $1/10$ second intervals, for example. When the desired headway $T_{HDWAY\ DES}$ value is located between the preset intervals then incremental adjustment with the gap adjust switch 28 will adjust the headway $T_{HDWAY\ DES}$ to the nearest increment in the selected direction.

Figure 4:
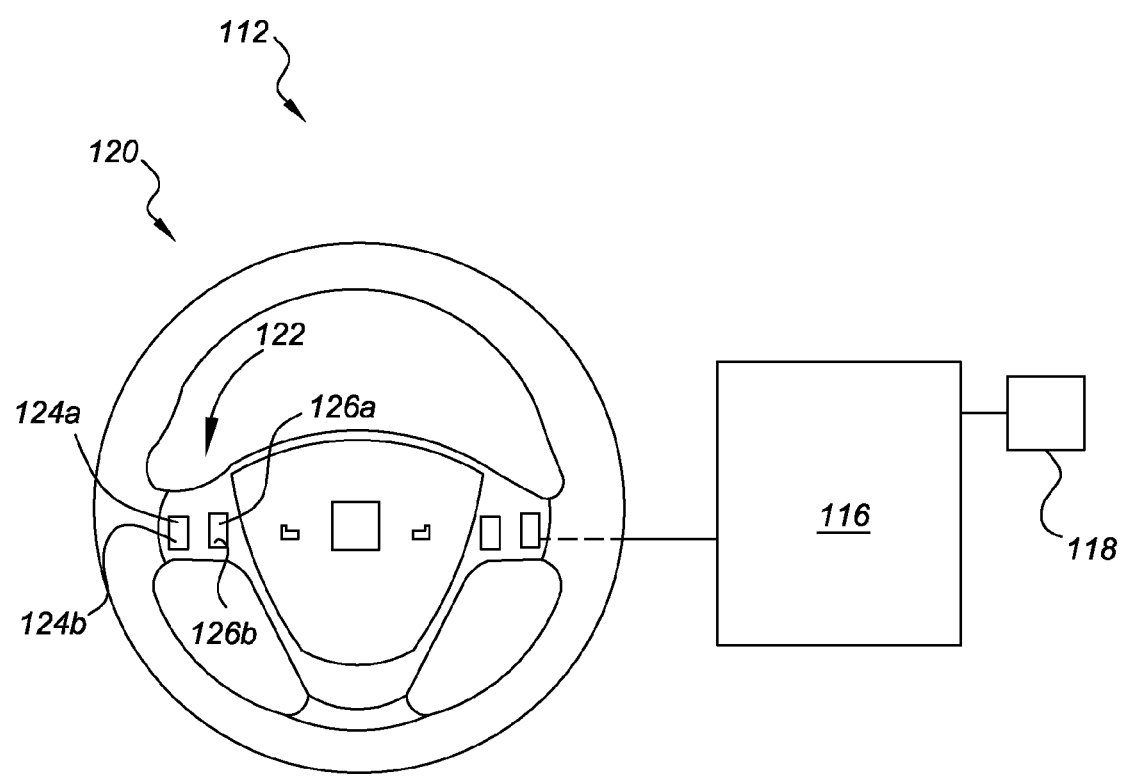
FIG. 4 is a schematic view of another embodiment of a steering wheel having user inputs for the adaptive cruise control system of the present invention.

In another embodiment, illustrated in FIG. 4, the adaptive cruise control system 112 includes a steering wheel 120 having a plurality of user inputs 122 located thereon. The adaptive cruise control system 112 is initiated with an ON/OFF switch 124a. The user establishes a desired speed $V_S$ using a set/coast switch 124b. A resume/accelerate switch 126a and a cancel switch 126b are also included, as is known in the art. A control 116 maintains the desired speed $V_S$ of the source vehicle 10. If the preceding vehicle 14 is detected, by a sensor 118, the control 116 adjusts the speed $V_S$ of the source vehicle 10 through throttle and brake control to maintain a desired headway $T_{HDWAY\ DES}$ between the source vehicle 10 and the preceding vehicle 14. The desired headway $T_{HDWAY\ DES}$ is established upon initiation, step 32, of the adaptive cruise control system 12, as described with respect to FIG. 3. Following that, the vehicle operator can adjust the desired $T_{HDWAY\,DES}$ by resetting the desired speed $V_S$ with the set/coast switch 124*b*. Resetting the desired speed $V_S$ would initiate, step 32, the automatic setting of the desired headway $T_{HDWAY\,DES}$, as described with respect to FIG. 3.

While the best modes for carrying out the invention have been described in detail, those familiar with the art to which this invention relates will recognize various alternative designs and embodiments for practicing the invention within the scope of the appended claims.

The invention claimed is:

1. An adaptive cruise control system for a vehicle comprising:
   at least one switch to provide a user input;
   a sensor to detect a distance from an object in a path of the vehicle;
   a control to determine and maintain a desired headway between the vehicle and the object based upon the user input and the detected distance; wherein the control calculates an actual headway based upon the user input and the detected distance; wherein the desired headway is a predetermined minimum value when the actual headway is less than the predetermined minimum value; and wherein the desired headway is a predetermined maximum value when the actual headway is more than the predetermined maximum value.

2. The adaptive cruise control system of claim 1, wherein the desired headway is a predetermined value when the sensor detects no object in the vehicle path.

3. The adaptive cruise control system of claim 2, wherein the predetermined value is the predetermined maximum value.

4. The adaptive cruise control system of claim 1, wherein the desired headway is the actual headway when the actual headway is more than the predetermined minimum value and less than the predetermined maximum value.

5. The adaptive cruise control system of claim 1, wherein the control is configured to receive a second user input and to incrementally change the desired headway based upon the second user input.

6. A method for setting an adaptive cruise control system on a vehicle comprising:
   initiating the adaptive cruise control system with at least one user input;
   detecting whether an object is in a path of the vehicle with a sensor;
   calculating an actual headway between the object and the vehicle based upon data from the sensor when an object is detected in the path of the vehicle;
   determining a desired headway between the vehicle and the object based upon the actual headway by comparing the actual headway to a predetermined minimum and a predetermined maximum; wherein the desired headway is the actual headway when the actual headway is more than the predetermined minimum and less than the predetermined maximum; and
   setting the desired headway.

7. The method of claim 6, wherein the determining the desired headway further comprises, selecting a predetermined headway when no object is detected by the sensor.

8. The method of claim 7, wherein the predetermined headway is the predetermined maximum.

9. The method of claim 6, wherein the desired headway is the predetermined minimum when the actual headway is less than the predetermined minimum.

10. The method of claim 6, wherein the desired headway is the predetermined maximum when the actual headway is more than the predetermined maximum.

11. The method of claim 6, further comprising, adjusting the desired headway by preset increments using a second user input.

12. A method for setting a headway in an adaptive cruise control system comprising:
    initiating the adaptive cruise control system with a user input;
    detecting an object in a vehicle path with a sensor;
    comparing an actual headway between the object and the vehicle to a predetermined minimum time and a predetermined maximum time; and
    setting a desired headway to the predetermined minimum when the actual headway is less than the predetermined minimum, setting the desired headway to the predetermined maximum when the actual headway is more than the predetermined maximum, and setting the desired headway to the actual headway when the actual headway is more than the predetermined minimum and less than the predetermined maximum.

13. The method of claim 12, further comprising, setting the desired headway to the predetermined maximum when there are no objects detected by the sensor.

14. The method of claim 12, further comprising adjusting the desired headway by a preset increment using a second user input.

* * * * *